United States Patent [19]

Akaiwa et al.

[11] Patent Number: 4,747,101
[45] Date of Patent: May 24, 1988

[54] METHOD OF DETERMINING OPTIMAL TRANSMISSION CHANNEL IN MULTI-STATION COMMUNICATIONS SYSTEM

[75] Inventors: Yoshihiko Akaiwa; Yukitsuna Furuya; Kazutomo Kobayashi, all of Tokyo, Japan

[73] Assignee: NEC Corporation, Tokyo, Japan

[21] Appl. No.: 854,961

[22] Filed: Apr. 22, 1986

[30] Foreign Application Priority Data

| Apr. 22, 1985 | [JP] | Japan | 60-85836 |
| Jun. 5, 1985 | [JP] | Japan | 60-122223 |
| Oct. 11, 1985 | [JP] | Japan | 60-226245 |
| Oct. 16, 1985 | [JP] | Japan | 60-231652 |

[51] Int. Cl.⁴ ............................................. H04Q 11/00
[52] U.S. Cl. ........................................ 370/95; 370/89; 455/34; 379/59; 340/825.03
[58] Field of Search ............... 370/95, 89, 85, 124; 455/33, 34; 379/59, 63; 340/825.5, 825.51, 825.03

[56] References Cited

U.S. PATENT DOCUMENTS

| 3,913,017 | 10/1975 | Imaseki | 379/59 |
| 4,155,040 | 5/1979 | Harmon et al. | 455/34 |
| 4,366,480 | 12/1982 | Van Hatten | 370/85 |
| 4,592,049 | 5/1986 | Killat et al. | 370/89 |
| 4,594,706 | 6/1986 | Kobayashi | 370/89 |
| 4,597,104 | 6/1986 | Ohki et al. | 340/825.03 |
| 4,672,657 | 6/1987 | Dershowitz | 455/34 |

FOREIGN PATENT DOCUMENTS 3014859 10/1981 Fed. Rep. of Germany ........ 379/59

Primary Examiner—Douglas W. Olms
Assistant Examiner—Melvin Marcelo
Attorney, Agent, or Firm—Sughrue, Mion, Zinn, Macpeak, and Seas

[57] ABSTRACT

In order to effectively avoid cochannel interferences in a multi-station communications system utilizing a plurality of channels in common, the order of transmission channels to be used is determined utilizing a transmission priority assigned to each channel. The subject matter is characterized in that (a) the transmission priority of a selected channel is raised if the selected channel is not used at another station, and (b) is lowered if the selected channel is used at another station. This means that the past use records of the transmission channels are accumulated so that a good channel can be selected with high probability. In other words, a transmission channel with high priority is still ready to be used even if it was not selected in the preceding selection.

6 Claims, 6 Drawing Sheets

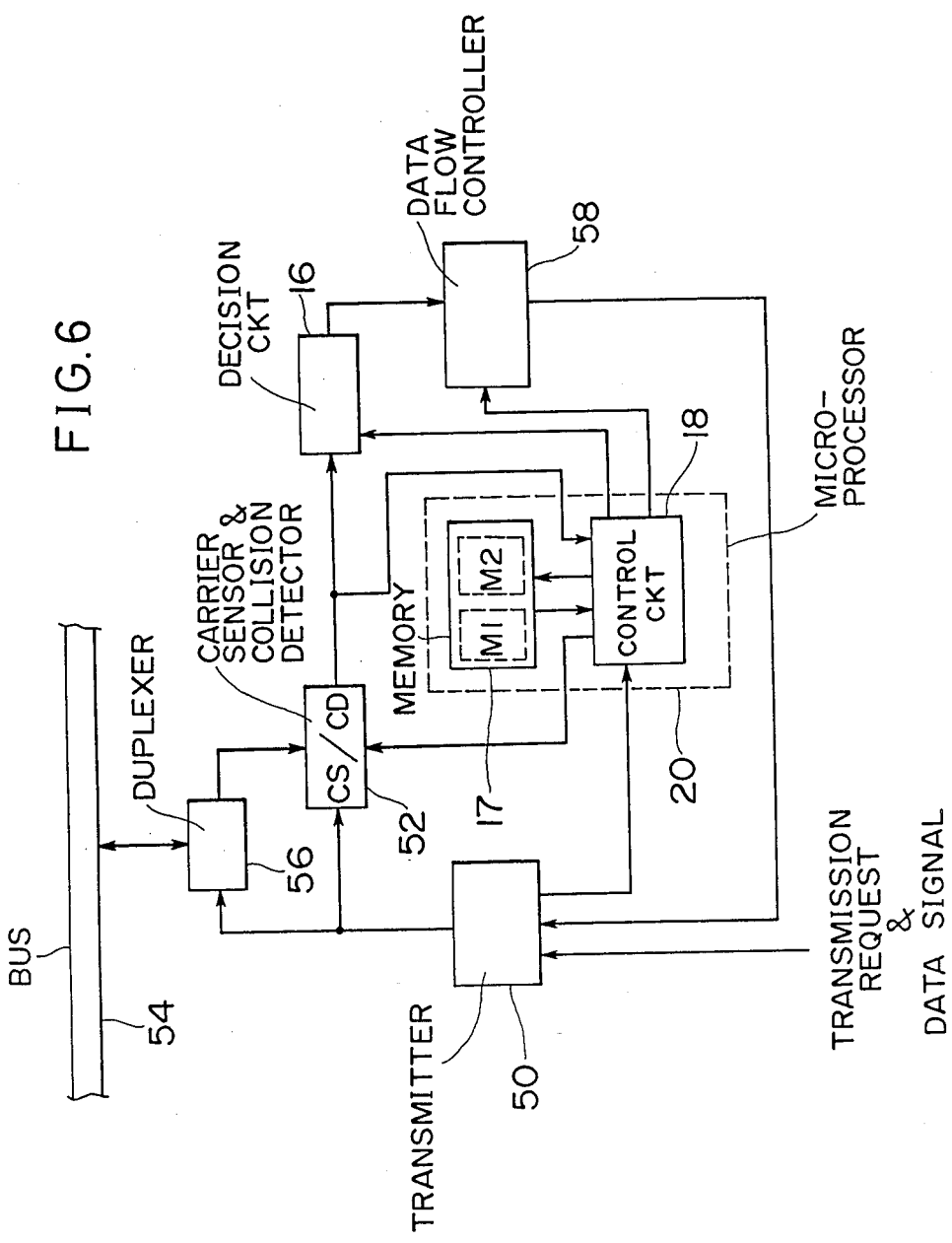

METHOD OF DETERMINING OPTIMAL TRANSMISSION CHANNEL IN MULTI-STATION COMMUNICATIONS SYSTEM

BACKGROUND OF THE INVENTION

1. Field of the Invention

This invention relates to a method of determining transmission channels in the optimal order to prevent interference problems in a multi-station communications system, and more specifically to a method of allocating transmission channels in the optimal order according to priority assigned to each channel. This invention will be discussed in connection with a mobile radio communications system, however, it should be noted that it is applicable to a LAN (Local Area Network) as well.

2. Description of the Prior Art

It is known in the art to apply frequency reuse in a mobile radio communications system in order to satisfy various objectives such as large subscriber capacity, efficient spectrum use, widespread availability, adaptability to traffic density, etc. The frequency reuse refers to the use of channels on the same radio carrier frequency to cover different area which are separated from one another by sufficient distances so that cochannel interference is not objectionable. A system utilizing such concept is known as a cellular land mobile radio system. For further data relating to the frequency reuse, a reference should be made to an article entitled "Optimal Channel Reuse in Celluar Land Mobile Radio Systems", IEEE Transactions on Vehiclular Technology, Vol. VT-32, No. 3, August 1983, Pages 217-224.

Through frequency reuse, the cellular mobile radio communication system can handle a number of simultaneous calls greatly exceeding the total number of allocated channel frequencies. If the traffic demand in some cell reaches the capacity of that cell, the cell requires a revision of cell boundaries so that the area formerly regarded as a single cell contains several cells.

Subdividing the cell, however, tends to accelerate the difficulty of defining the cell boundaries due to varying transmission characteristics which are caused by tall buildings, other facilities and so on. As a result, in order to reduce cochannel interferences, the same channel set should be allocated to adequately separated cells, which in turn reduces the effects of frequency reuse.

SUMMARY OF THE INVENTION

Therefore, a primary object of this invention is to provide a method by which strict boundary requirements between adjacent service areas is substantially eliminated.

Another object of this invention is to provide a method which is well suited foor use in a multi-station communications system in which the frequency reuse is effective even with very small and adjacent service areas.

Still another object of this invention is to provide a method which is applicable to a LAN with very high efficiencies in reducing data collision.

An aspect of this invention takes the form of a method of determining the order of transmission channels to be used at each station, utilizing a transmission priority assigned to each channel, comprising the steps: (a) receiving a transmission request; (b) selecting the channel with the highest transmission priority among the channels not in use at the station; (c) determining whether the selected channel is being used at another station; (d) in the event that the selected channel is not being used at another station, performing the transmission via the selected channel; and (e) in the event that the selected channel is being used at another station, selecting a channel which has the next highest transmission priority among the channels not in use at the station; (f) determining whether the channel selected at step (e) is used at another station; (g) in the event that the channel selected at step (e) is not used at another station, employing the channel for transmission; and (h) in the event that the channel selected at step (e) is being used at another station, repeating steps (e) and (f).

BRIEF DESCRIPTION OF THE DRAWINGS

The features and advantages of the present invention will become more clearly appreciated from the following description taken in conjunction with the accompanying drawings in which like blocks are denoted by like reference numerals and in which:

FIG. 6 is a block diagram of an embodiment according to this invention when applied to a node of the LAN system.

DETAILED DESCRIPTION OF THE PREFERRED EMBODIMENTS

Figure 1:
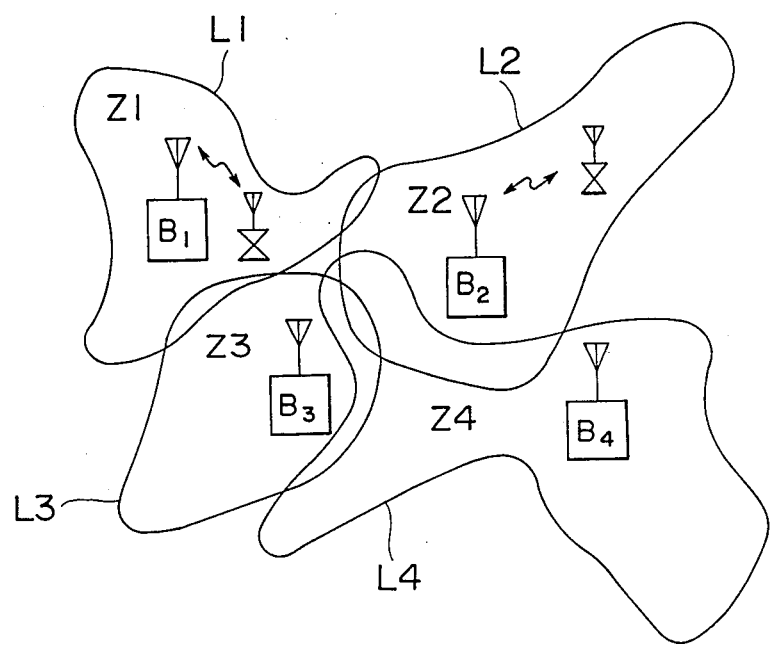
FIG. 1 is a sketch showing a plurality of cell sites and mobile units locaed in service areas around the cell sites.

As shown in FIG. 1, four cell sites B1 to B4 are located apart from one another. Service areas Z1 to Z4 are respectively defined by boundaries L1 to L4. Mobile units M1, M2 are respectively located within service areas Z1, Z2 and are able to communicate with the corresponding sites B1, B2. Each of the areas Z1 to Z4 is of a small size and is irregularly shaped due to varying field strengths of signals from the sites B1-B4. In the event the mobile unit is located within the overlapped areas, it is able to communicate with all the associated cell sites. Thus, there exists a possibility of cochannel interference. However, this problem can be eliminated with the present invention.

This invention is characterized in that there is no need to strictly determine or design the boundaries of the adjacent service areas. This feature will become apparent from the following descriptions.

Figure 2:
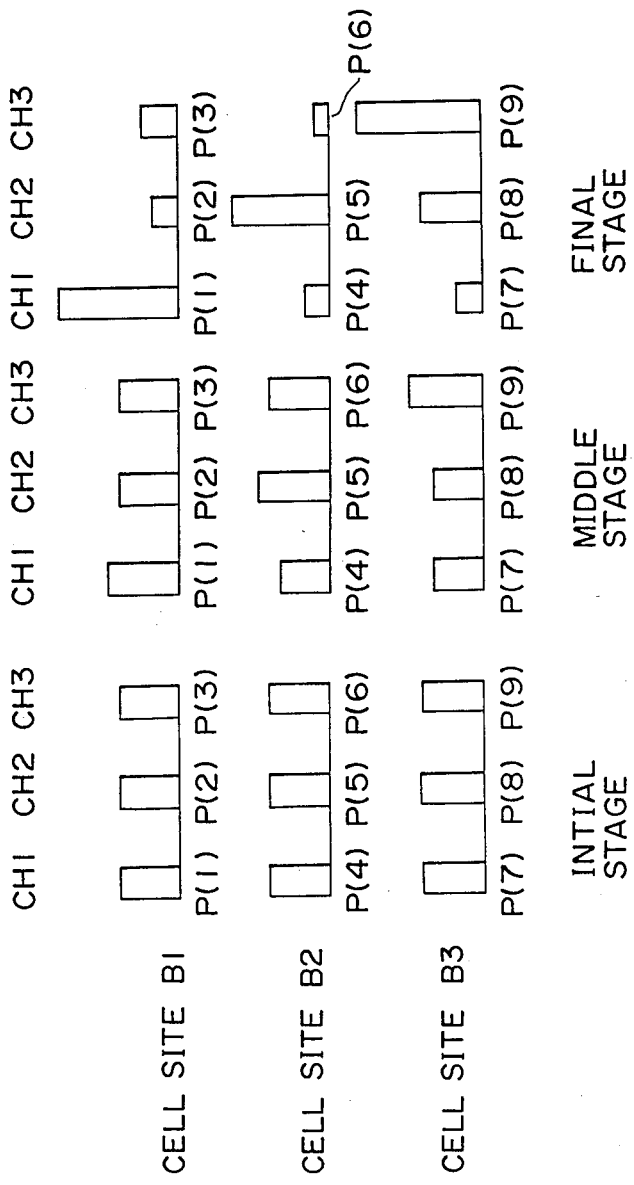
FIGS. 2A to 2C each illustrates the values of priority functions (priority levels) assigned to the channels of the cell sites.

Reference will be made to FIGS. 2A, 2B and 2C, in which only three cell sites B1-B3 and three channels CH1-CH3 are represented for the purpose of simplicity.

FIG. 2A denotes the levels of nine transmission priority functions $P(1)$-$P(9)$ associated with the sites B1-B3 and channels CH1-CH3. As shown, the levels of the priority functions $P(1)$-$P(9)$ are identical with one another, which means that the sites B1-B3 have not yet initiated their communication operations (viz., initial stage).

Each of FIGS. 2B and 2C is similar to FIG. 2A expect that the levels of the transmission priority functions P(1)–P(9) are different. FIG. 2B shows the levels of the priority functions at an intermediate stage. That is, a relatively long period of time has passed but is still not sufficient to bring the priority levels to their stationary or final stages. On the other hand, FIG. 2C illustrates the levels of the priority functions P(1)–P(9) at the stationary stage.

More specifically with FIGS. 2A–2C, it is assumed that a first transmission request reaches the site B1 from a mobile unit located in the service area Z1 (FIG. 1). Thereafter, the site B1 allocates the channel CH1 to the unit and allows same to communicate therethrough. This means that the channel CH1 was not occupied or, the field strength of a signal using CH1 was so weak in the service zone Z1 that the site B1 allows the use of CH1. Consequently, the priority function P(1) increases its level by a predetermined value since the channel CH1 was not used when accessed.

Let it be assumed that (a) the site B2 is supplied with a transmission request and (b) the channel CH1 is in use at the site B1. In that event, the site B2 detects that the channel CH1 is occupied and, hence, allows the use of the channel CH2. As a result, the priority assigned to the channel CH1 is decreased due to the non-availability of the channel, while the priority assigned to the channel CH2 is increased in that CH2 was available.

On the other hand, let it be assumed that a transmission request is made at the site B3 and that the site B3 responds to the request and allows the channel CH3 to be used. In this case, it is assumed that both the channels CH1 and CH2 are in use at the sites B1 and B2 respectively.

For a subsequent transmission request at each site, the channel having the highest priority among the channels not in use is selected. Following this it is determined whether or not this channel is being used at another site. In the event that the channel thus selected is in use at another site, the site allocates the next channel available. It will be understood that the channel with higher priority is used more frequently than that with lower priority. Thus, nine priority functions P(1)–P(9) finally reach the levels shown in FIG. 2C (viz., stationary stage). It should be noted that the priority levels must be limited to a predetermined range by providing upper and lower limits.

The FIG. 2C case is based on the assumption that there is a large amount of traffic at each site. On the contrary, if there is little traffic, eventually the priority levels saturate as shown in FIG. 4C.

Figure 3:
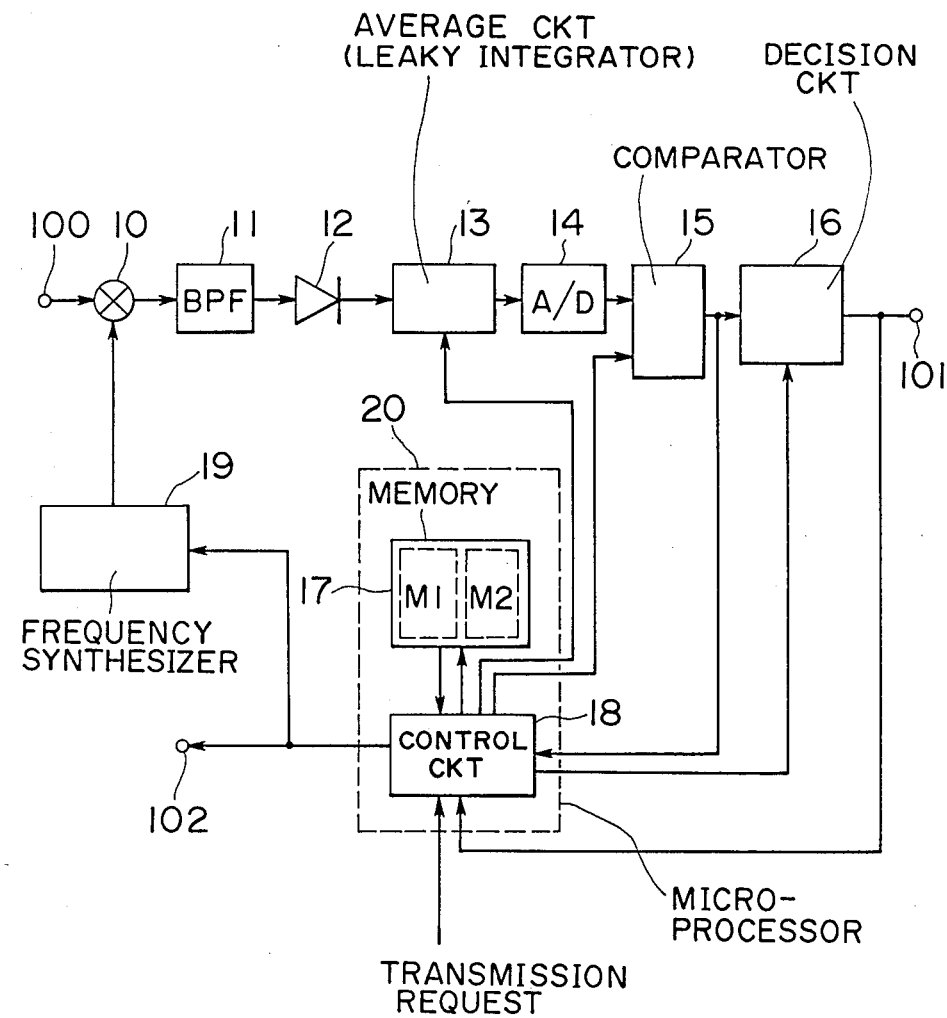
FIG. 3 is a block diagram showing an example of circuitry via which the methods according to this invention can be implemented.

FIG. 3 is a block diagram showing a circuit in which the methods according to this invention can be carried out. As shown, the FIG. 3 arrangement includes a multiplier 10, a narrow band-pass filter (BPF) 11, a detector 12, an average circuit or leaky integrator 12, an analog-to-digital (A/D) converter 14, a comparator 15, a decision circuit 16, a microprocessor 20 having a memory 17 and control circuit 18, and a frequency synthesizer 19, all of which are coupled as shown. The memory is provided with at least two memory sections M1 and M1. The section M1 previously stores frequency determination data which are selectively applied to the synthesizer 19 to derive therefrom a corresponding sine wave frequency. On the other hand, the memory section M2 previously stores a plurality of the transmission priority levels, which are updated or renewed during processing of the transmission requests.

For the purpose of brevity it is assumed that (a) the transmission priorities stored in the memory section M2 have been updated and (b) the priority levels are arranged in an ascending or descending order with the aid of the control circuit 18.

Under these conditions, the control circuit 18, upon receiving the transmission request, selects the channel with the highest transmission priority among the channels not in use and then accesses the memory section M2 to derive the priority level therefrom. On the other hand, the control circuit 18 accesses, in accordance with the selected channel, the memory section M1 to obtain the frequency determination data corresponding to the selected channel. This is appled to the synthesizer 19. The multiplier 10 is supplied with an incoming signal from a terminal 100 and the output of the synthesizer 19, and thereafter produces an IF signal. The IF signal from the multiplier 10 is band-pass filtered at the BPF 11, whose output is detected at the detector 12 and then integrated at the average circuit or leaky integrator 13. Subsequently, the A/D converter converts the output of the detector 11 into a corresponding digital signal. In the above it is assumed that the average circuit 13 is not supplied with any signal from the control circuit 18.

The comparator 15 receives the output of the A/D converter 14 and a threshold level from the controller 18, wherein the threshold level is assumed to be constant at this point. The comparator 15 compares the two levels applied thereto and produces a signal indicating whether the allocated or selected signal is used at another site. More specifically, in the event that the output of the A/D comparator 14 is less than the threshold level, the output of the comparator 15 indicates that the allocated channel is not in use at another site. Otherwise, it indicates that the allocated channel is in use at another site. The comparator 15 applies its output to the decision circuit 16.

The output of the comparator 16 is utilized to update the priority level of the selected channel. Viz., if the selected channel is being used at another site, the priority level is lowered by a predetermined amount. Otherwise, it is incremented by a predetermined amount, wherein this amount can be set to be equal to the above-mentioned predetermined one.

The decision circuit 16 is additionally supplied with the priority level derived from the memory section M2 as mentioned above and performs the following operations:

1. In the event that (a) the output of the comparator 15 indicates that the selected channel is not being used and (b) the priority level assigned to the selected channel exceeds a predetermined level, the decision circuit 16 indicates the use of the selected channel and applies a signal indicating to that effect to a transmitter section (not shown) via an output terminal 101. At the same time, the decision circuit 16 instructs the control circuit 18 to emit a signal indicating the frequency of the selected signal to a suitable external circuit through an output terminal 102;

2. On the contrary, in the event that (a) the output of the comparator 15 indicates that the selected channel is presently in use at another site and (b) the priority level assigned to the selected channel does not reach the predetermined level, the decision circuit 16 instructs the control circuit 18 to select a new channel having the next highest priority level;

3. In the case #2, all the unused channels satisfying the above-mentioned condition (viz., each priority exceeds the predetermined level) have been selected and determined as in use at another site(s), then the decision circuit 16 applies a busy signal to the terminal 101; and

4. The decision circuit applies the busy signal to the terminal 101 when a priority level associated with the selected signal is less than the predetermined level. It should be noted that the channel selection (or allocation) is made in the descending order of priority.

After the completion of such operations, the levels of the priority functions are rearranged (or sorted) in the ascending or descending order in response to, for example, a signal applied from the decision circuit 16.

In FIG. 2C, when the site B2 receives a transmission request while using the channel CH2, the site B2 selects the channel CH1 with the second highest priority and determines whether this channel is being used at another site. If the site B2 detects that the channel CH1 is not in use, there is a high probability of erroneous detection in that the priority allocated to CH1 is considerably low. In other words, CH1 is probably being used at the site B1. Such erroneous detection occurs due to temporary reduction of signal strength due to fading or degradation of other propagation characteristics. To overcome such a problem, the control circuit 18 is coupled to the average circuit 13 as shown in FIG. 3. More specifically, the control circuit 18 applies, for example, the reciprocal of the priority level of the selected channel to the average circuit 13, and controls the operating time duration thereof. Consequently, the average circuit 13 averages the incoming signal for a longer time duration as the priority level becomes lower. This means that a more reliable output is obtained from the average circuit 13.

Figure 4:
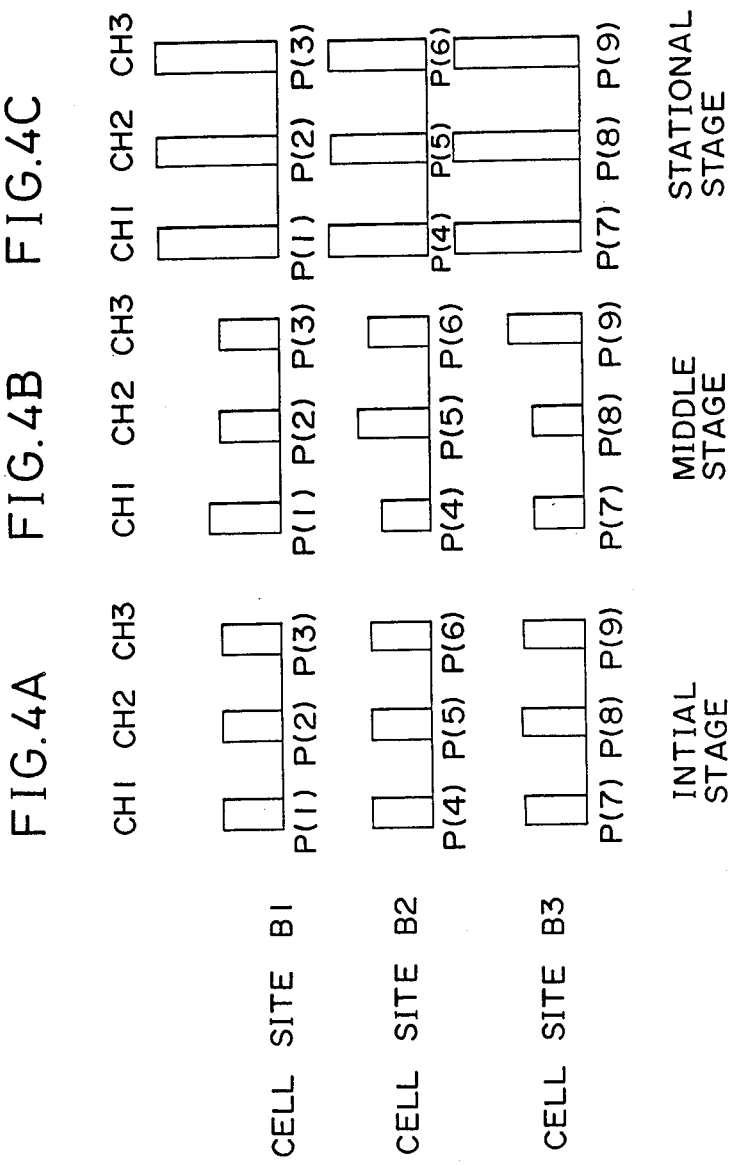
FIGS. 4A to 4C each illustrates the levels of the priority functions allocated to the channels of the center stations.

Reference will be made to FIG. 4, in which FIGS. 4A and 4B are identical to FIGS. 2A and 2B, respectively. On the other hand, FIG. 4C is similar to FIG. 2C except that in the former drawing all the levels of the transmission priorities are saturated. As mentioned briefly in the above, the case shown in FIG. 4C occurs when there is little traffic at each site. More specifically, in such a case, even the channel with the lowest priority may be used in that the possibility that each site is able to use the lowest priority channel increases. Hence, eventually the low priority level is gradually incremented and saturates after a long time period.

In order to overcome such a difficulty, the control circuit 18 (or memory 17) stores the number of channel selection times (N(i)) and a probability that the selected channel is not employed (Q(i)), wherein "i" is a channel number. Every time the channel is selected and checked as to the use thereof, N(i) is updated by N(i)+1 and Q(i) by $\{Q(i)N(i)+1\}/\{N(i)+1\}$. The priority function or level is increased by Q(i) in the event that the selected channel is not employed, while the priority function is lowered or decremented by $(1-Q(i))$ in the event that the selected channel is used. Changing the priority function along with the above-mentioned algorithm prevents the priority function from saturating.

As shown in FIG. 3, the controller 18 is coupled to the comparator 15 in order to control the threshold level which is used to determine the use of a selected channel. According to this invention, the threshold level is controlled according to the priority level associated with the selected channel.

Figure 5:
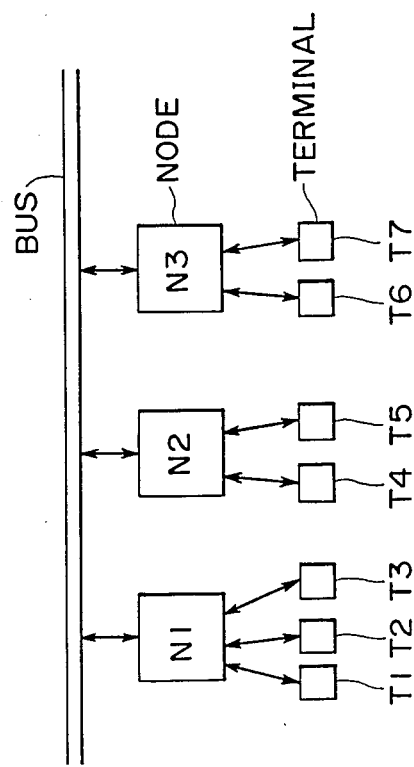
FIG. 5 is a schematic diagram of a portion forming part of a LAN system.

FIG. 5 is a simplified diagram of a LAN (Local Area Network) to which this invention is applicable. In the drawing, a plurality of nodes N1, N2 and N3 are provided between a bus 54 and terminals T1 through T7.

The general concept of the LAN is well known in the art and hence detailed descriptions will be omitted for brevity.

FIG. 6 is a block diagram showing a transmission controller which is provided in each of the nodes T1 through T7 (FIG. 7). In the FIG. 8 arrangement, access to the bus 54 is carried out using the method called CSMA/CD (Carrier Sense Multiple Access with Collision Detection) which is known in the art. Upon a transmitter 50 receiving a transmission request, it supplies the control circuit 18 with the output thereof to inform same of the request. Thereafter, the control circuit 18 resets the memory 17 and allocates a channel to be used. These procedures have already been described in detail with reference to FIG. 3. The control circuit 18 applies the allocated channel information to a carrier sensor/collision detector (CA/CD) 52, which receives via a duplexer 56 a signal from the bus 54 and detects whether the allocated channel is being used by another node. The CA/CD 52 also detects a packet collision which however is not concerned with this invention. A series of channel allocations according to the order of the priorities assigned to the channels, is similar to that of the embodiment shown in FIG. 3, so that further details will not be referred to for the purpose of simplicity. In the event that the decision circuit 16 detects that the allocated channel is vacant, a data flow controller 58 instructs the transmitter to use the alloted channel. Otherwise, the next channel is allocated. Other operations of th FIG. 8 arrangement will be readily understood when referring to those of the FIG. 3 arrangement.

What is claimed is:

1. In a multi-station communications system utilizing a plurality of channels in common, a method of determining the order of transmission channels to be used at each station utilizing a transmission priority assigned to each channel, comprising the steps:

(a) receiving a transmission request;
    (b) selecting the channel with the highest transmission priority among the channels not in use at the station;
    (c) determining whether the selected channel is used at another station;
    (d) in the event that the selected channel is not used at another station, the transmission priority of the selected channel is raised and the transmission is performed via the selected channel; and
    (e) in the event that the selected channel is used at another station, the transmission priority of the selected channel is lowered and, thereafter, a channel is selected which has the next highest transmission priority among the channels not in use at the station;
    (f) determining whether the channel selected at step (e) is used at another station;
    (g) in the event that the channel selected at step (e) is not used at another station, the channel is employed for transmission; and
    (h) in the event that the channel selected at step (e) is used at another station, steps (e) and (f) are repeated.

2. A method as claimed in claim 1, wherein a time period required for the determining process at each of steps (c) and (f) is changed according to the transmission priority assigned to the selected channel.

3. A method as claimed in claim 1, wherein the transmission priority assigned to each channel is a probability of the selected channels being not used at another station.

4. A method as claimed in claim 1, wherein a threshold level for use in determining whether the selected channel is used is changed according to the transmission priority assigned to each channel.

5. A method as claimed in claim 3, wherein a threshold level for use in determining whether the selected channel is used, is changed according to the transmission priority assigned to each channel.

6. In a multi-station communications system utilizing a plurality of channels in common, a method of determining the order of transmission channels to be used at each station utilizing a transmission priority assigned to each channel, comprising the steps:
 (a) receiving a transmission request;
 (b) selecting the channel with the highest transmission priority among the channels not in use at the station, wherein the transmission priority is a probability of the selected channels being not used at another station;
 (c) determining whether the selected channel is used at another station, wherein a time period required for the determining is changed according to the transmission priority assigned to the selected channel, and wherein a threshold level for use in determining whether the selected channel is used is changed according to the transmission priority assigned to each channel;
 (d) in the event that the selected channel is not used at another station, the transmission is performed via the selected channel; and
 (e) in the event that the selected channel is used at another station, a channel is selected which has the next highest transmission priority among the channels not in use at the station;
 (f) determining whether the channel selected at step (e) is used at another station, wherein the time period required for the determining is changed according to the transmission priority assigned to the selected channel, and wherein a threshold level for use in determining whether the selected channel is used is changed according to the transmission priority assigned to each;
 (g) in the event that the channel selected at step (e) is not used at another station, the channel is employed for transmission; and
 (h) in the event that the channel selected at step (e) is used at another station, steps (e) and (f) are repeated.

* * * * *